Oct. 8, 1957  C. K. SHANK  2,808,730
FABRICATED SHEET METAL ARTICLE
Filed June 22, 1953

INVENTOR:-
CARL K. SHANK
BY:-
Spencer, Johnston, Cook & Root
ATT'YS

United States Patent Office 2,808,730
Patented Oct. 8, 1957

2,808,730

FABRICATED SHEET METAL ARTICLE

Carl K. Shank, Mishawaka, Ind., assignor to Dodge Manufacturing Corporation, Mishawaka, Ind., a corporation of Indiana Application June 22, 1953, Serial No. 363,330

12 Claims. (Cl. 74—230.8)

The present invention relates, in general, to the fabrication of sheet metal products, especially hollow articles of sheet metal, the invention having more particular reference to an improved sheet metal conveyor belt pulley.

Conveyor belt pulleys are widely used for supporting moving belts of the short used in conveying loose material between spaced apart relatively remote locations. Such pulleys commonly comprise parts of sheet metal, such as steel, secured together, as by welding, and including cylindrical wall forming segments having abutting end edges weldingly seamed together to form a complete cylindrical belt engaging wall of the pulley.

Although sheet metal pulleys, fabricated in such fashion, have been found generally satisfactory for conveyor belt supporting purposes, the same exhibit inherent weakness along the longitudinally extending welded seams which integrate the cylindrical wall forming segments of the pulley. Such weakness is due to difficulty encountered in welding together abutting end edges of relatively thin sheet metal pieces, it being impossible to obtain complete penetration of the weld throughout the entire thickness of the joined pieces, in the circumstances mentioned, because of the danger of completely burning through the material of the joined portions of relatively thin section and thereby spoiling the weld.

As a consequence, it is conventional practice to limit penetration of the weld to approximately two-thirds of the thickness of the joined parts to thereby eliminate the danger of burning completely through said parts, during the welding operation. Accordingly, the circumferential or belt engaging wall portion of the pulley is relatively weaker, to an appreciable degree, at and along the welded seams thereof as compared with its remaining portions. Furthermore, as the peripheral surface of the pulley, including the welded seam portions thereof, becomes worn away, through the abrasive action of a supported belt, said welded seams progressively become relatively weaker as compared with the remaining portions of the cylindrical pulley wall.

An important object of the present invention is to provide an improved welding technique whereby complete welding penetration may be obtained between abutting edges of relatively thin sheet metal sections, particularly peripheral pulley wall segments, without burning through the sections to be joined and thereby spoiling the weld; a further object being to employ a backing bar, in conjunction with relatively thin sheet metal sections to be weldingly joined in edge abutting relationship, in order to aid in obtaining complete welding penetration in the joint between the abutting edges of the joined pieces.

Another important object is to provide an improved technique for welding sheet metal pieces together at and along abutting edges thereof in order to produce a hollow sheet metal member having integrally joined peripheral wall segments; a further object being to produce a hollow fabricated sheet metal article having a sleeve-like peripheral wall portion comprising one or more formed sheet metal parts secured together along abutting edges of said part or parts by means of a welded seam or seams having complete penetration in the joint between said abutting edges.

Another important object is to provide an improved hollow sheet metal belt pulley; a further object being to provide an improved method of making a hollow sheet metal article of cylindrical configuration.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings:

Fig. 1 is a side view of a hollow sheet metal structure comprising a conveyor belt pulley embodying the present invention;

Figs. 2 and 3 respectively are sectional views taken substantially along the lines 2—2 and 3—3 in Fig. 1;

Figure 1:
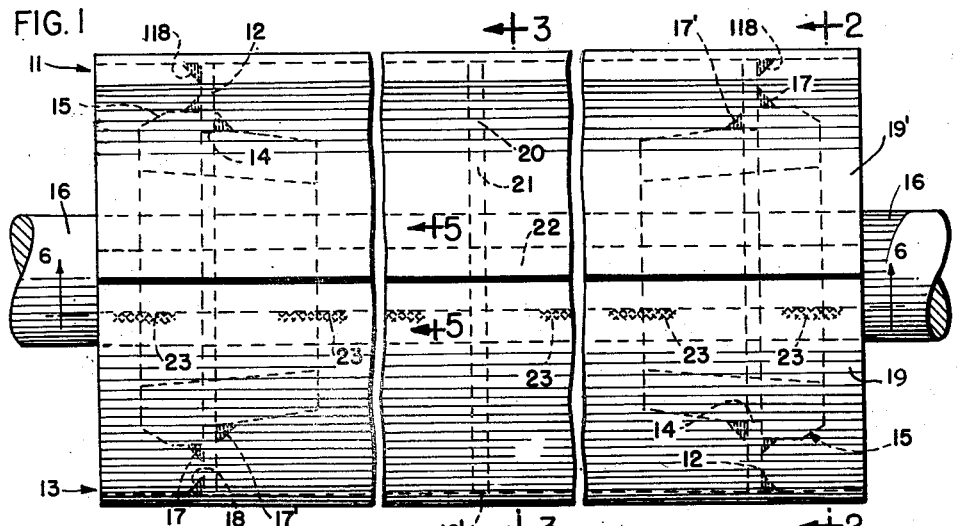
Figure 2:
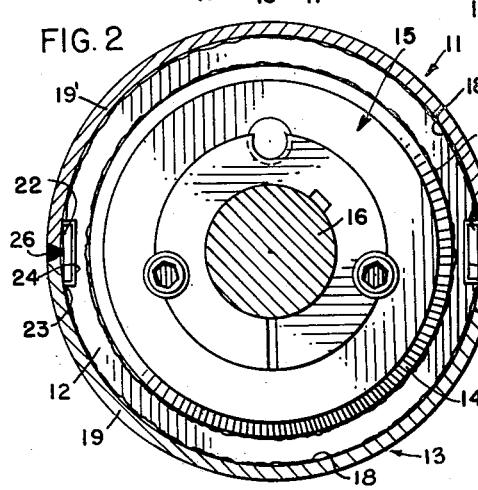

To illustrate the invention, the drawings show a hollow fabricated sheet metal structure 11 comprising a conveyor belt pulley, the same being formed from sheet metal parts including end plates 12 and curved sheet metal plate means forming a sleeve 13 mounted upon and embracing the peripheral edges of the end plates 12. As shown, the end plates may comprise circular sheet metal discs formed with central openings 14 in which bushing means 15 of any suitable character for mounting the structure on a support shaft 16 may be secured in any preferred fashion, as by welding the parts together as at 17 and 17'. The sleeve 13 preferably encloses the end plates 12 and is secured to the peripheral edges thereof, preferably by welding, as at 18 and 18'.

While the sleeve 13 may possibly comprise a single sheet of material formed to sleeve-like configuration and presenting the opposite end edges of the formed sheet in abutting relationship, it is preferable to form the sleeve 13 in several segments adapted to be secured upon the peripheral edges of the end plates 12, with each end edge of each segment disposed in abutting relationship with respect to the facing end edge of an adjacent segment, such abutting end edges being weldingly seamed together in order to form the sleeve 13 as an integral circumferentially extending wall of the structure 11. As shown, the device 11 may comprise a pair of cooperating segments 19 and 19' forming the peripheral sleeve 13.

Where the structure 11 has overall length in the axial direction of the shaft 16 of the order of twice its diameter or less, the structure may comprise merely the sleeve 13 and the spaced end plates or walls 12, including, of course, the mounting bushings 15; but where the structure has axial length in excess of twice its diameter, one or more intermediate supporting discs or plates 20 may be mounted within and secured to the sleeve 13 in spaced relationship between the end plates 12 in order to strengthen and rigidify the medial portions of such axially elongated pulley structures. Where but one intermediate disc 20 is employed, it may be spaced in the structure midway between the end plates 12. Where several reenforcing discs are incorporated in the structure, they may, of course, be spaced apart equally or otherwise in the axial direction of the pulley, between the end plates 12. The plates 12 and 20 preferably have identical peripheral size and configuration. The plate or plates 20, however, may have central openings 21 of size sufficient merely to receive the shaft 16 freely therethrough. The openings 21, as a consequence, may be of substantially smaller size than the openings 14 of the end plates 12.

In order to fabricate the hollow pulley structure 11, the end plates 12, the intermediate plate or plates 20, if any be incorporated in the structure, and the peripheral wall segments 19 and 19' may be preformed to the required size, shape and configuration, by any preferred metal stamping, pressing, or forming procedure. The bushing elements 15 may then be weldingly secured to the end plates 12 in the openings 14, after which the end plates may be mounted upon an assembly shaft, by means of the bushings 15, and secured on said shaft in desired or required spaced apart relationship.

Figure 5:
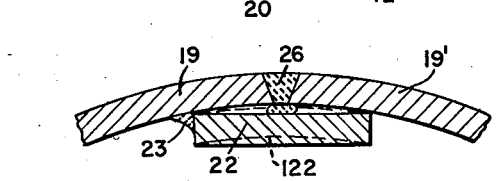
Fig. 5 is an enlarged sectional view taken substantially along the line 5—5 in Fig. 1.

Back-up bars 22 may next be tack-welded, as at 23, respectively at the opposite end edges of one of the rim segments, such as the segment 19, said bars 22 preferably comprising each a strip of sheet metal of gauge comparable to that of the rim segments, each back-up bar being mounted upon the inner wall of the segment in overlapping relation with respect to the end edge thereof. The rim segment 19, upon which the back-up bars 22 are tack-welded, may then be applied to the peripheral edges of the spaced apart discs 12 and welded thereto, as at 18. The rim segment 19 may also be welded, as at 18', to the segment covered edges of the plates 20, if any be included in the structure. If desired, the backing bars 22 may be transversely curved or bent, as shown in dotted lines at 122 in Fig. 5 of the drawings, to conform with the curvature of the segments 19 and 19'.

Figure 6:
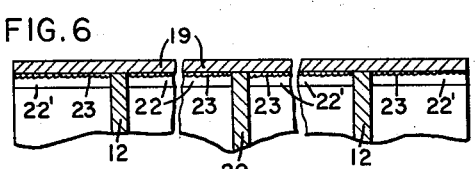
Fig. 6 is a sectional view taken substantially along the line 6—6 in Fig. 1 for the purpose of illustrating a modified construction.

In order to accommodate the back-up bars 22, the discs 12 and the intermediate plate or plates 20, if any be incorporated in the structure, may be formed with bar receiving notches 24 in the peripheral edges thereof. If desired, as shown in Fig. 6, the notches 24 may be omitted either in the discs 12 or in the plate or plates 20, or in both discs and plates, by forming the backing bars 22 in segments 22', such bar segments being secured on the wall segment 19 in position such that the facing ends of adjacent bar segments are spaced apart sufficiently to snugly receive therebetween the intervening edge portion of a disc 12 or a plate 20.

Figure 3:
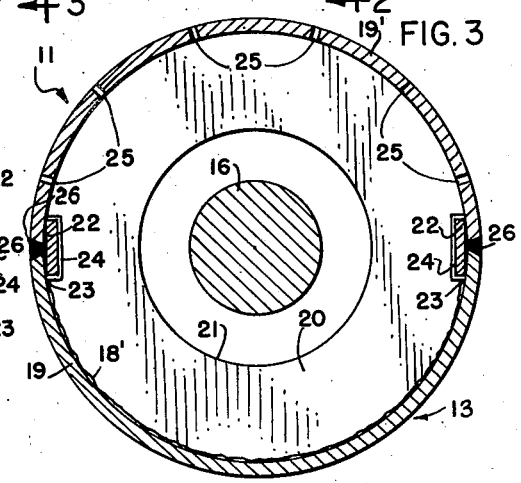

The remaining wall segment or segments 19' may then be applied to cover the exposed portions of the peripheral edges of the discs 12 and the intermediate plate or plates 20, if any be incorporated in the structure. If, as shown in Fig. 3 of the drawings, but a single additional segment 19' be employed, it may be applied in position with its opposite end edges abutting and facing the opposite end edges of the wall segment 19, said opposite end edges of the segment 19', when in such position, overlying upon the portions of the backing bars 22 which project outwardly of the end edges of the segment 19. Thereupon the segment 19' may be tack-welded at intervals, as at 25, to the peripheral edges of the discs 12 and, if desired, to the peripheral edges of the intermediate plate or plates 20, if any be incorporated in the structure, such tack welding, if desired, being accomplished at welding perforations formed in the wall segment 19'. The wall segment 19' may also be welded to the peripheries of the end plates 12, as at 118.

Figure 4:
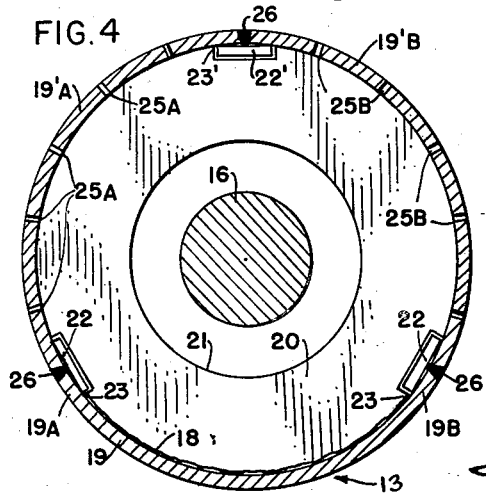
Fig. 4 is a sectional view, similar to Fig. 3, showing a modified construction illustrating the invention.

If, however, as shown in Fig. 4 of the drawings, more than one additional wall segment 19' be incorporated in the structure, one of said additional segments 19'A may be provided with back-up bar means 22', similar to the bar means 22, and secured along an end edge of said additional wall segment 19'A, as by tack welding 23' of the sort shown at 23. Such segment 19'A may be applied upon the peripheral edges of the discs 12 with the edge thereof which is remote from the backing bar 22' disposed in position abutting with one end edge 19A of the wall segment 19, and in overlying relationship with respect to the portions of the bar 22 which project outwardly of said end edge of the wall segment 19. The wall segment 19'A may then be tack welded, as at 25A, upon the underlying edges of the discs 12 and of the intermediate plate or plates 20, if any be incorporated in the structure. Thereupon another additional wall segment 19'B may be applied in position upon the peripheral edges of the discs 12 and plate or plates 20, if any be incorporated in the structure, to enclose the space between the backing bar carrying edge of the segment 19'A and the spaced facing edge 19B of the segment 19, which of course also carries a backing bar. When so positioned, the segment 19'B will snugly abut, at its opposite end edges, with bar carrying edges of the segments 19 and 19'A, said opposite end edges of the segment 19'B being thus disposed in overlying relationship with respect to the portions of the back-up bars 22 and 22' which project beyond the edges of the segments on which the same are mounted. The wall segment 19'B may then be secured upon the edges of the discs 12 and of the plate or plates 20, if any be incorporated in the structure, as by means of tack welding 25B.

As a final step in the fabrication of the hollow structure 11, the abutting end edges of the segments 19 and 19', in overlying relationship with respect to the backing bars, may be integrated by welding to produce welded seams 26 completely penetrating the entire thickness of the peripheral wall segments, thereby providing seams of maximum strength. Indeed said seams comprise the strongest portions of the sleeve 13. Such maximum wall strength, at the seams 26, is accomplished by the backing bars 22 which are arranged in the structure so as to permit the welded seams 26 to completely penetrate the wall thickness of the sleeve 13.

The present invention provides substantial improvement in the manner of fabricating hollow sheet metal articles, without increasing the cost of the product. Although the back-up bars themselves represent an addition to the cost of material employed in building the structure, yet the use of such bars enables the welding of the seams to be accomplished more rapidly in that extreme care need not be exercised in welding the seams 26. Indeed the welding of the seams 26 may be accomplished by using automatic high-speed welding equipment.

It should be understood, of course, that the hollow pulley structure 11 may be made with a rim formed from a single piece of sheet material. In such case, only one back-up bar need be provided at the single seam joining the abutting opposite ends of the single peripheral wall sheet. The two-piece rim structure, here illustrated in Fig. 3, however, can be made more quickly and easily than a structure embodying a one-piece rim. Accordingly, the two-piece structure is generally preferred, although the multiple piece rim construction, illustrated in Fig. 4, may perhaps be more desirable for incorporation in devices of unusually large size. It will be noted, also, that structures embodying backing bars equally spaced circumferentially of the structure 11 will be substantially balanced dynamically about the axis of rotation thereof.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A fabricated sheet metal structure comprising spaced apart support plates, a plurality of curved sheet metal segments forming a hollow sleeve on and enclosing said support plates, said segments providing pairs of abutting end edge portions, a backing bar secured at and along one of said abutting end edge portions of each said pair in position projecting outwardly thereof and beneath the other of said edge portions, and a welded seam integrating each of said pairs of abutting edge portions and extending along the facing surface of the associated backing bar, said segments having substantially equal length, peripherally of the sleeve, to thereby equally space said seams and associated bars circumferentially in said structure.

2. A fabricated sheet metal structure comprising spaced apart support plates, a pair of curved sheet metal segments forming a hollow sleeve on and enclosing said support plates, said segments providing pairs of abutting end edge portions disposed at diametrically opposite sides of said sleeve, a backing bar extending at and along the inner side of one of each pair of edge portions in position projecting outwardly thereof and beneath the abutting edge portion, and a welded seam integrating each of said abutting edge portions and extending along the facing surface of the associated backing plate.

3. A fabricated sheet metal structure comprising at least three curved sheet metal plates forming a hollow sleeve providing pairs of abutting end edge portions, a backing bar secured at and along the inner side of one of each pair of said edge portions in position projecting outwardly thereof and beneath the abutting edge portion, and a welded seam integrating each of said abutting edge portions and extending along the facing surface of the associated backing bar, said plates all have substantially the same dimension, peripherally of the sleeve, whereby to equally space said seams and associated backing bars circumferentially in said structure.

4. A fabricated sheet metal structure comprising spaced apart support plates, curved sheet metal plate means forming a hollow sleeve supported upon and secured about said support plates, said plate means having abutting end edge portions, a backing bar secured upon the inner side of said plate means at and along one of said edge portions in position projecting outwardly thereof and beneath the other of said edge portions, the peripheral edges of said support plates being notched to accommodate said backing bar, and a welded seam integrating said abutting edge portions and extending along the facing surface of the associated backing bar.

5. A fabricated sheet metal structure comprising spaced apart support plates, sheet metal means forming a hollow sleeve supported on and secured to said plates, said sheet metal means comprising a sleeve segment overlying and weldingly secured to the peripheral portions of said plates, a backing bar secured to each of the opposite end edge portions of said segment, each bar being secured to the inner side of said segment in position presenting bar portions projecting outwardly of the terminal edge of the portion on which mounted, said sheet metal means also comprising additional segmental plate means mounted upon said support plates and providing end edge portions overlying upon said projecting portions of said backing bars in facing and alined registration with said opposite end edge portions of said sleeve segment, and a welded seam integrating each of the opposite edges of said segment with the facing edges of said segmental plate means, said seams extending each along the facing surface of the associated backing bar, said sleeve segment and said additional segmental plate means comprising segments of substantially equal length peripherally of the sleeve, whereby the backing bars may be equally spaced apart circumferentially in the structure.

6. A fabricated sheet metal structure comprising spaced apart support plates, sheet metal means forming a hollow sleeve supported on and secured to said plates, said sheet metal means comprising a sleeve segment overlying and weldingly secured to the peripheral portions of said plates, a backing bar secured to each of the opposite end edge portions of said segment, each bar being secured to the inner side of said segment in position presenting bar portions projecting outwardly of the terminal edge of the portion on which mounted, the peripheral edges of said support plates being notched to accommodate said backing bars, said sheet metal means also comprising additional segmental plate means mounted upon said support plates and providing end edge portions overlying upon said projecting portions of said backing bars in facing and alined registration with said opposite end edge portions of said sleeve segment, and a welded seam integrating each of the opposite edges of said segment with the facing edges of said segmental plate means, said seams each extending along the facing surface of the associated backing bar.

7. A fabricated sheet metal pulley structure comprising spaced apart plates of like circular peripheral size, sheet metal means forming a hollow cylindrical sleeve supported on and secured to the peripheral edges of said plates, said sheet metal means comprising a sleeve segment overlying and weldingly secured to the peripheral portions of said plates, a backing bar secured to each of the opposite end edge portions of said segment, each bar being secured to the inner side of said segment in position presenting bar portions projecting outwardly of the terminal edge of the portion on which mounted, the peripheral edges of said support plates being notched to accommodate said backing bars, said sheet metal means also comprising additional segmental plate means mounted upon said support plates and providing end edge portions overlying upon said projecting portions of said backing bars in facing and alined registration with said opposite end edge portions of said sleeve segment, and a welded seam integrating each of the opposite edges of said segment with the facing edges of said segmental plate means, said seams each extending along the facing surface of the associated backing bar.

8. A fabricated sheet metal pulley structure comprising a plate of circular peripheral configuration, cylindrically curved sheet metal plate means forming a hollow sleeve supporetd upon and secured about the peripheral edges of said plate, said sheet metal plate means having abutting end edge portions, a backing bar secured upon the inner side of said plate means at and along one of said edge portions in position projecting outwardly thereof and beneath the other of said edge portions, the peripheral edge of said support plate being notched to accommodate said backing bar, and a welded seam integrating said abutting edge portions and extending along the facing surface of the associated backing bar.

9. A fabricated sheet metal structure comprising a plurality of curved sheet metal segments forming a hollow sleeve, said segments providing pairs of abutting end edge portions, a backing bar secured at and along one of said abutting end edge portions of each said pair in position projecting outwardly thereof and beneath the other of said edge portions, and a welded seam integrating each of said pairs of abutting edge portions and extending along the facing surface of the associated backing bar, said segments having substantially equal length, peripherally of the sleeve, to thereby equally space said seams and associated bars circumferentially in said structure, said sleeve forming sheet metal segments being mounted upon spaced apart support plates, said backing bars extending between and having opposite ends abutting upon said support plates.

10. A fabricated sheet metal structure comprising spaced apart support plates, a plurality of curved sheet metal segments forming a hollow sleeve on and enclosing said support plates, said segments providing pairs of abutting end edge portions, a backing bar secured at and along one of said abutting end edge portions of each said pair in position projecting outwardly thereof and beneath the other of said edge portions and a welded seam integrating each of said pairs of abutting edge portions and extending along the facing surface of the associated backing bar, said segments having substantially equal length, peripherally of the sleeve, to thereby equally space said seams and associated bars circumferentially in said structure, the sleeve forming segments being mounted upon a pair of end plates and having end portions extending outwardly of said end plates, said backing bars including portions extending between and abutting said end plates at the opposite ends of said bar portions, and bar segments extending outwardly of said end plates and between said end plates and the projecting ends of the hollow sleeve.

11. A fabricated sheet metal structure comprising spaced apart support plates, a plurality of curved sheet metal segments forming a hollow sleeve on and enclosing said support plates, said segments providing pairs of abutting end edge portions, a backing bar secured at and along one of said abutting end edge portions of each said pair in position projecting outwardly thereof and beneath the other of said edge portions, and a welded seam integrating each of said pairs of abutting edge portions and extending along the facing surface of the associated backing bar, said segments having substantially equal length, peripherally of the sleeve, to thereby equally space said seams and associated bars circumferentially in said structure, said sleeve forming segments being mounted upon a pair of end plates and upon one or more intermediate plates parallel with respect to and disposed between said end plates and in spaced relationship therewith within the hollow sleeve, said backing bars comprising bar segments extending between said end and intermediate plates and abutting the same at the opposite ends of said bar segments.

12. A fabricated sheet metal structure comprising spaced apart support plates, a plurality of curved sheet metal segments forming a hollow sleeve on and enclosing said support plates, said segments providing pairs of abutting end edge portions, a backing bar secured at and along one of said abutting end edge portions of each said pair in position projecting outwardly thereof and beneath the other of said edge portions, and a welded seam integrating each of said pairs of abutting edge portions and extending along the facing surface of the associated backing bar, said segments having substantially equal length, peripherally of the sleeve, to thereby equally space said seams and associated bars circumferentially in said structure, said spaced apart support plates being formed with detachable shaft journals, whereby said support plates may be readily mounted in coaxial alinement upon a support shaft prior to and during attachment thereon of the sleeve forming curved sheet metal segments.

References Cited in the file of this patent

UNITED STATES PATENTS

| | | |
|---|---|---|
| 1,290,091 | Cole | Jan. 7, 1919 |
| 1,648,626 | Smith | Nov. 8, 1927 |
| 1,766,585 | Banfield et al. | June 24, 1930 |
| 2,219,085 | Watson | Oct. 27, 1940 |

FOREIGN PATENTS

| | | |
|---|---|---|
| 12,665 | Australia | May 3, 1934 |